UNITED STATES PATENT OFFICE.

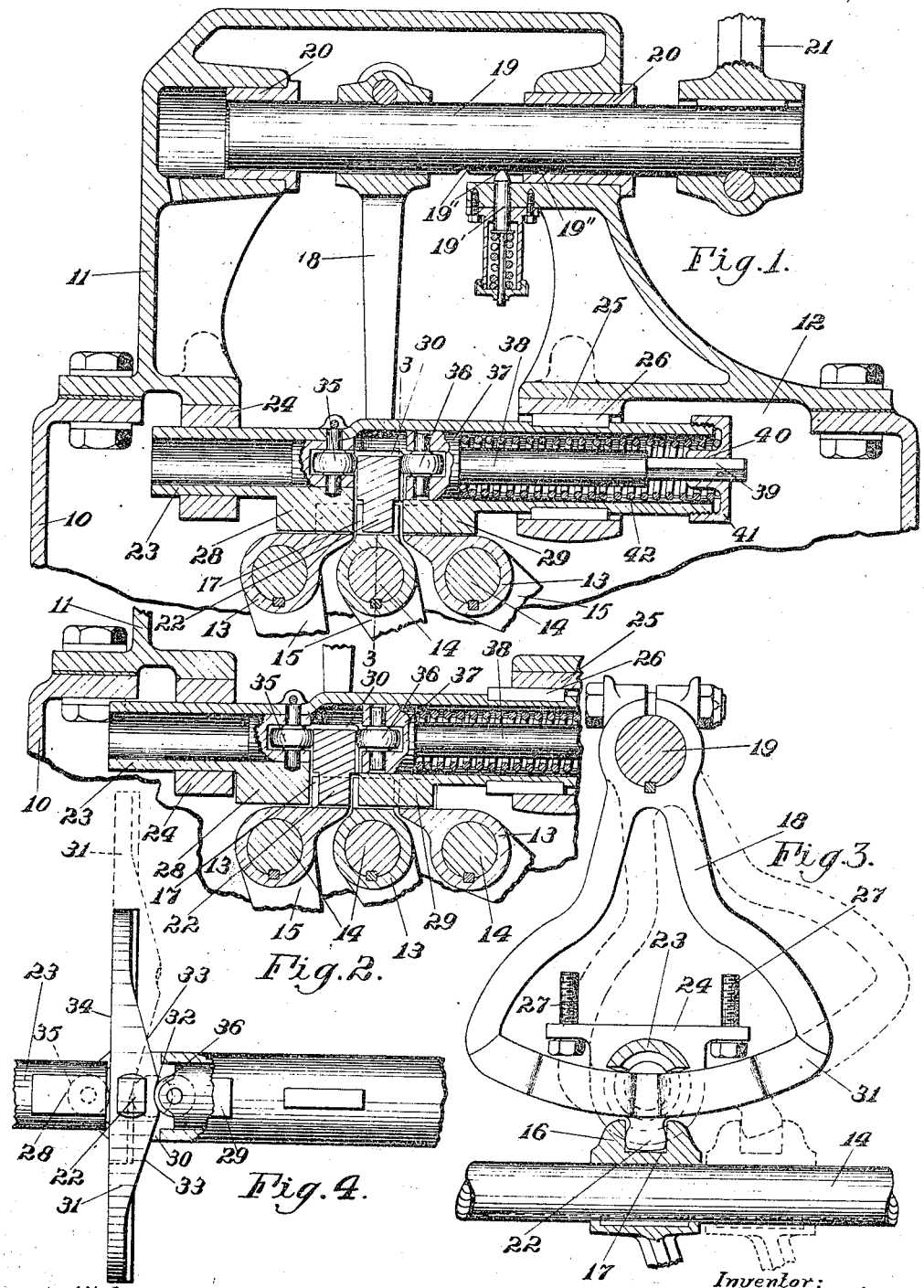

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

GEAR-SHIFTING MECHANISM.

1,321,087.         Specification of Letters Patent.       Patented Nov. 11, 1919.

Application filed April 12, 1915. Serial No. 20,849.

*To all whom it may concern:*

Be it known that I, HAROLD D. CHURCH, a citizen of the United States, and resident of Detroit, Wayne county, State of Michigan, have invented certain new and useful Improvements in Gear-Shifting Mechanism, of which the following is a specification.

This invention relates to gear shifting mechanism and particularly such mechanism of the selective type. Most of these mechanisms are adapted to three or four forward and one reverse speed. In the illustrated form of the invention herein three shifter elements are shown, each of these elements being adapted to shift either in one or two directions from a central or neutral position. If applied to a four speed and reverse gear box, two of these elements would operate in two opposite directions from neutral to engage the four forward speed gears, and the third would operate in one direction only from neutral to engage the reverse gear.

One of the objects of the invention is to provide a gear shifting mechanism of simple form, that lends itself well to economical manufacture, and that operates easily and with certainty and precision.

Other objects of the invention will appear from the following description taken in connection with the drawings, in which:—

Figure 1 is a vertical section taken through the upper part of a casing which forms a support for the mechanism;

Fig. 2 is similar to Fig. 1 with parts in different positions;

Fig. 3 is a vertical sectional view approximately on the line 3—3 of Fig. 1, and Fig. 4 is an underneath view of the operating arm and locking bolt shown in Fig. 1.

Referring to the drawings, the support or casing for the mechanism is shown as formed in two parts the lower or main part 10 and the upper or cover part 11. The cover part closes the opening 12 formed in the main part of the casing. Suitably mounted in one part of the casing, the main part for instance, are shifter elements, 13. Three such elements are shown and they are arranged to slide on parallel rods 14 suitably supported in the casing. Each of these shifter elements has an arm 15 which is adapted to shift a gear or gear means in a well known manner. Each of these elements also has a part 16 in which is an upwardly opening engaging notch 17 for a shifting means hereinafter described. It will be understood that these notches are arranged adjacent each other, and in line when the shifter elements are in neutral position, and that said elements are adapted to be shifted on the rods 14 in either direction from said neutral position. It will be seen also that the shifter elements are arranged in the casing immediately beneath the opening 12 whereby they may be readily accessible and may be engaged by the shifting means which is shown as mounted upon and removable and replaceable with the cover or casing part 11.

The shifting means above referred to comprises an arm 18 secured to and operated by a rock shaft 19 which rocks and slides axially in suitable bushings 20 in the cover 11. It is yieldingly positioned by a spring pawl 19' operating in notches 19". A hand operating lever 21 is secured to the projecting end of the rock shaft and it will be understood that by means of this lever the rock shaft, and with it the arm 18, may be shifted axially of the shaft and rocked in the bushings 20.

The arm 18 has a part 22 which is adapted to enter or engage in the several notches 17 to thereby engage and shift the shifter elements one at a time. This part is no wider than the notches 17 so that when in full engagement with one shifter element it cannot be in engagement with any other such element.

It is desirable in this class of mechanism to positively lock the shifter elements that are not engaged by the shifting means to thereby prevent the accidental meshing of more than one gear combination. In the present invention a locking device is mounted in the part of the casing that supports the arm 18 and it coöperates with said arm and with the notches in the shifter elements. This device is shown as comprising a bolt 23 of tubular form, mounted to slide in brackets 24, 25, keys 26 preventing the bolt from turning in the brackets. These brackets may be integral with the cover or detachable therefrom, as shown, bolts 27 securing them in place. The bolt 23 when in position is arranged above the shifting elements and transversely thereto and has parts or lugs 28, 29, adapted to enter the notches 17 of said elements. These lugs are separated by a notch or opening 30 formed in the bolt, this notch 30 being slightly wider than one of the parts 16 so that these parts may operate freely one at a time between the lugs. The lugs are of sufficient length to simultaneously engage and lock two of the shifter elements as shown in Fig. 2. Also it will be seen that the notch 30 is sufficiently deep to take a part 31 of the arm 18 and permit said arm to oscillate freely with its arc shaped part 31 in said notch 30, so that the lateral movements of the arm 18 will carry the locking bolt 23 with it and hold it in locking position while the arm is in engagement with and shifting the element not engaged by the lugs 28, 29 of said bolt. Thus in Fig. 1, the arm 18, part 22, is engaging the central shifter element and the other two elements are locked by the lugs 28 and 29 respectively. In this position the arm may be rocked and it will carry with it the central shifter element, leaving the other two elements locked in neutral position. In Fig. 2 the arm 18 has been laterally shifted to engage the left hand shifter element and the other two elements are locked by the lug 29. The third position is not shown but it is evident that the arm may be shifted to engage the right hand shifter element and the lug 28 will then lock the other two elements.

It is evident that the shifter elements and the rods upon which they slide, are assembled in one part of the casing and all of the other operating mechanism is assembled in the other part of the casing. Thus with the shifter elements in place and in neutral position, the cover or upper part of the casing with all of its mechanism in place and in neutral position may be placed on the casing and bolted down, and in doing this, the part 22 will enter the notch in the intermediate shifter element, and the lugs 28 and 29 engage in the respective notches of the two other shifting elements. Obviously, it is an easy matter to assemble the various operating parts in their respective supports when the two parts of the casing are separated.

It is desirable that the arm 18 be yieldingly held in intermediate or neutral position, also that as soon as said arm has been initially moved from said intermediate position toward one of its gear shifting positions, it shall yieldingly be pressed toward said gear shifting position. Means for this purpose are provided in connection with the locking bolt and the arc shaped part 31 of the arm 18. It will be understood that this part 31 operates constantly in the notch 30 formed in the locking bolt and as shown, the part 31 is formed with a slight central depression 32 and tapering or wedge-like surfaces 33 extending from the central depression 32 in both directions. The face or surface 34 which is opposite the inclined surfaces 33 is preferably plain and operates against a roller 35 suitably mounted in the locking bolt.

On the opposite side of the part 31 from the roller 35 is another roller 36 mounted in a sliding block 37 and adapted to operate on the inclined surfaces 33 and the depression 32. The block 37 is formed with a stem 38 which extends lengthwise of the locking bolt and has a squared portion 39 which slides in a squared opening 40 in a cap 41 screwed or otherwise secured to the end of the locking bolt. A coiled spring 42 surrounds the stem 38 between the block 37 and the cap 41, this spring being under tension and constantly pressing the roller 36 toward the surfaces 33 and depression 32. Thus in the neutral position of the parts, the roller 36 is in the depression 32, as particularly shown in Fig. 4, and it yieldingly holds the arm 18 in neutral position. As soon as the arm is initially moved toward the gear shifting position such as that shown in dotted lines in Fig. 4, the roller 36 starts to slide down one of the inclined surfaces 33 and thus assists in the movement of the arm. Hence the operator may simply start the arm toward any one of the gear shifting positions and the spring mechanism in the locking bolt will automatically move it to that position and yieldingly hold it there.

It will be understood that the invention is not limited to the exact details of construction shown as it will be apparent that changes may be made without departing from the spirit or scope of the invention.

Having thus described my invention, what I claim and desire to secure by Letters Patent is:—

1. In a gear shifting mechanism, in combination, a casing having an opening, a cover for said opening, shifter elements supported in the casing, and means supported in the cover for operating one and locking the other of said shifter elements, said means being movable to reverse the locking and shifting, and said means being removable and replaceable with the cover without disturbing either the means or the elements.

2. In a gear shifting mechanism, in combination, a casing having an opening, a cover for said opening, shifter elements supported in the casing, and means supported in the cover for operating one and locking the other of said shifter elements said means being movable to reverse the locking and shifting operations, said cover and means forming one unit and said casing and elements forming a second unit to insure the simultaneous assembling or disassembling of the means and elements as when the cover is being mounted upon or removed from the casing.

3. In a gear shifting mechanism in combination, a casing having an opening, a cover for said opening, shifter elements in said casing provided with notches, a shifter arm mounted in said cover and adapted to engage said notches, locking means also mounted in said cover, said means comprising a tubular bolt having integral lugs adapted to engage the notches in said shifter elements, and separated by a notch in said tubular bolt, said shifter arm extending through said last named notch and projecting between the separated lugs whereby said lugs engage shifter element notches at either side of said shifter arm.

4. In a gear shifting mechanism, in combination, a casing, shifter rods in said casing provided with notches, a cover for said casing, a tubular locking bolt mounted to reciprocate in said cover transversely of said rods, separated locking lugs on said bolt adapted to engage said notches, said bolt having a notch therethrough between said lugs, shifter means mounted to reciprocate and oscillate in said cover said means comprising a segmental guide and an engaging lug for the notches on said shifter rods, said guide passing through the notch in said tubular bolt and said engaging lug being so positioned that the lugs on said bolt engage the shifter rod notches at either side of said last named lug.

5. In a gear shifting mechanism, in combination, a casing formed in two separate parts, shifter elements supported in one of said parts each of said elements being adapted to move in two directions from a neutral position, an arm supported in the other of said casing parts for operating said elements one at a time, means also mounted in said second casing part for locking against movement the elements not engaged by said arm and a spring device carried by said locking means and adapted to hold the arm and its engaged shifter elements yieldingly away from neutral position.

In testimony whereof I affix my signature in the presence of two witnesses.

H. D. CHURCH.

Witnesses:
Le Roi J. Williams,
Clair J. Cote.